Patented Sept. 10, 1940

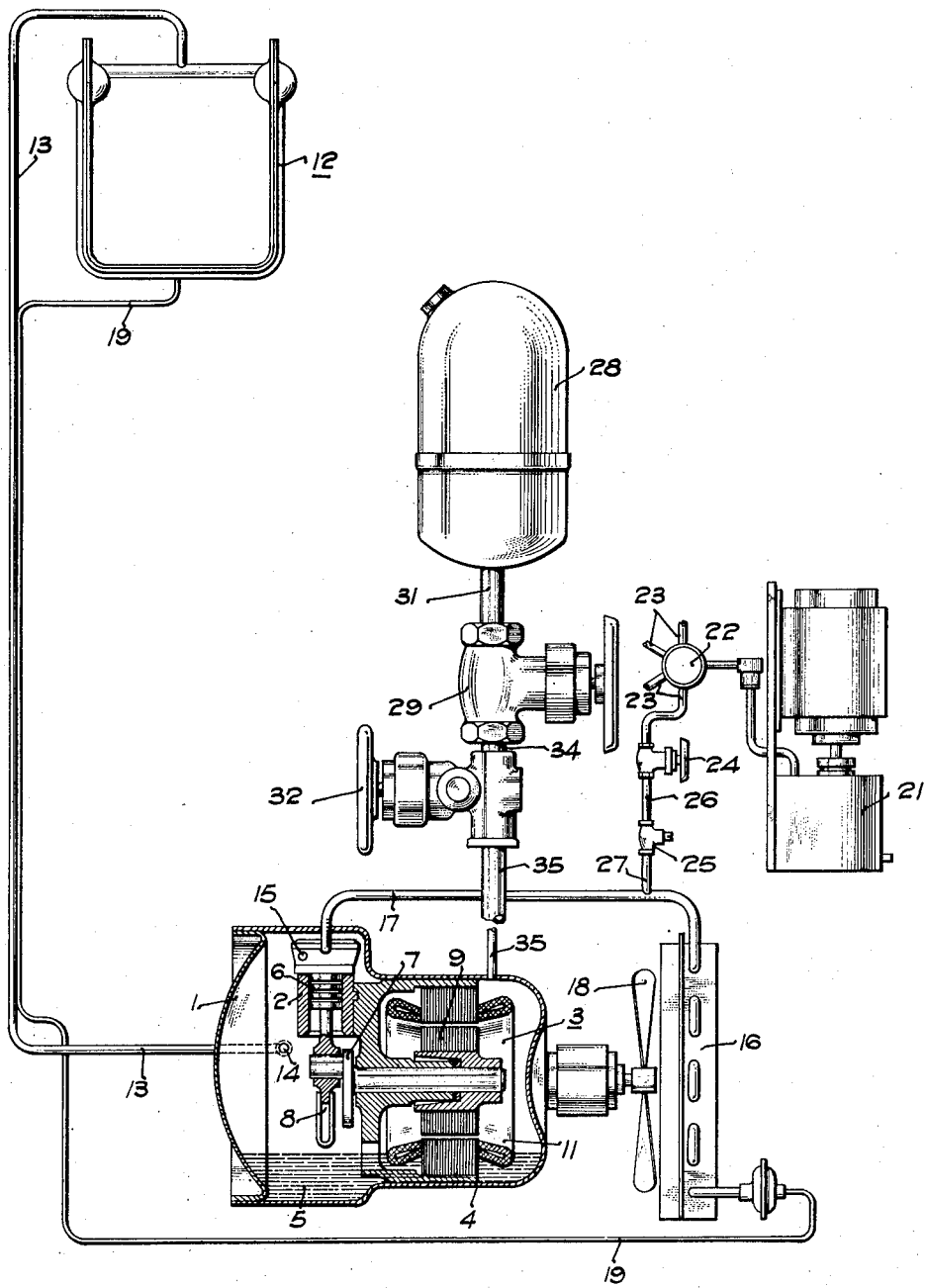

2,214,699

UNITED STATES PATENT OFFICE 2,214,699

REFRIGERATION METHOD

Arthur W. Wood, Springfield, Mass., assignor to Westinghouse Electric & Manufacturing Company, East Pittsburgh, Pa., a corporation of Pennsylvania Application April 8, 1939, Serial No. 266,742

5 Claims. (Cl. 62—170)

My invention relates to refrigeration apparatus and to a method for charging refrigeration apparatus with refrigerant and lubricant.

Before a closed refrigerating system is charged, t is necessary for several reasons to remove all non-condensable gases, such as, for example, air from the refrigerating system. The presence of non-condensable gases will cause high head pressures in the high side of the system so that the efficiency of the system will be impaired and, if large amounts of non-condensable gases are present, the machine may even cease to operate. Furthermore, non-condensable gases and air in the system may cause oxidation and deterioration of certain parts thereof. Again, the non-condensable gases and air sometimes react with the lubricant or refrigerant to form water or acids with the result that the water or acids combine with other chemicals in the system and cause deterioration, oxidation and rusting of the parts of the system. In hermetically sealed systems wherein the motor and compressor are contained within a sealed casing, the presence of non-condensable gases or air may form chemical combinations with the refrigerant and lubricant which deleteriously affect the insulation on the windings of the motor, etc. It is, therefore, necessary to completely evacuate non-condensable gases from the system before it is placed in the field charged with refrigerant and lubricant.

In the copending application of Anderson and McCloy, Serial No. 156,162, filed July 28, 1937, for Refrigeration apparatus and method, and assigned to the assignee of the present application, an evacuating and charging system is disclosed wherein the closed system is partially evacuated by operation of the compressor with the high pressure side of the system open to atmosphere and wherein a container is attached to the system filled with the exact refrigerant charge therefor. The liquid refrigerant in the container enters the system and the compressor is operated to remove the remaining non-condensable gases from the system and collect them in said container. One outstanding advantage of the system set forth in the aforesaid Anderson and McCloy application is that the evacuation and charging may be readily conveyorized and the method disclosed, therefore, is particularly applicable to large production methods. Other advantages of the system disclosed in the Anderson and McCloy application are that very close control of the charge may be obtained and that evacuation is effected completely and without independent evacuating apparatus. However, on a small production scale the expense of a completely conveyorized assembly may not be justified. In such instances it becomes important to evacuate and charge quickly so that time and space may be conserved.

It is, therefore, an object of this invention to obtain many of the advantages of the evacuating and charging system disclosed by Anderson and McCloy in their aforesaid application and to effect such evacuation and charging in a shorter period of time.

It is also an object of the invention to effect accurate charging of a refrigerating system and furthermore to insure substantially complete removal of non-condensable gases from the system.

It is still another object of the invention to provide an evacuating and charging system for refrigerating units in which several units may be evacuated and charged at one time with a minimum of equipment.

It is still a further object of the invention to provide a charging and evacuating method which is particularly adaptable to hermetically sealed refrigerating systems and particularly wherein a continuously open restricting device is disposed between the condenser and evaporator of the system.

These and other objects are effected by my invention as will be apparent from the following description and claims taken in accordance with the accompanying drawing, forming a part of this application, in which the single figure of the drawing illustrates a compression refrigerating system to which my invention may be applied and also shows an enlarged charging container, as well as the vacuum pump utilized in practicing my invention.

Referring specifically to the drawing, numeral 1 designates a sealed motor-compressor unit of a refrigerating system which embodies a compressor 2 driven by a motor 3, both of which are contained in a sealed casing 4 containing a lubricant 5. The compressor illustrated is of the type wherein a piston 6 is reciprocated through a crank 7. A lubricant scoop 8 dips into the lubricant 5 and splashes it over the working parts of the motor and compressor. The motor 3 includes a rotor 9 and field windings 11, the latter preferably being formed of copper covered with suitable insulation, such as cotton, enamel or the like.

In operation as a refrigerating system, refrigerant vapor is withdrawn by the compressor 2 from an evaporator 12 through a conduit 13 which opens into the sealed casing 4 at 14. The refrigerant vapor enters the compressor 2 through a suction port 15 therein. Gas compressed by the compressor 2 is conveyed to a condenser 16 through a conduit 17, wherein the compressed refrigerant is cooled and condensed, the cooling being effected by a stream of air circulated over the condenser 16 by a motor driven fan 18. Condensed refrigerant is then fed through a capillary tube 19 to the evaporator 12, the capillary tube preferably being disposed in heat exchange relation with the suction conduit 13. After evaporation in the evaporator 12, the refrigerating cycle is repeated. A suitable control (not shown) for cycling the refrigerating system to maintain a predetermined evaporator temperature, is ordinarily provided.

In accordance with my invention, the refrigerating system has substantially all the non-condensable gases removed therefrom and is charged in the following manner. A motor-driven vacuum pump 21 is connected to a vacuum header 22, to which several refrigerating systems are attached by conduits 23. The conduits 23 are provided with hand valves, one of which is shown at 24. A screw driver operated purge valve 25 is connected to the hand valve 24 by a conduit 26 and is connected to the discharge conduit 17 of the refrigerating system by a conduit 27.

A container 28 for the refrigerant charge is connected to an upper hand valve 29 through a conduit 31. The hand valve 29 is in turn connected to a lower hand valve 32 through a conduit 34, and the lower hand valve 32 is attached to the interior of the sealed casing through a filler tube 35. The hand valve 32 is then closed and the vacuum conduit 26 is attached between hand valve 24 and screw driver valve 25. The container 28 with the exact refrigerant charge by weight therein, together with the hand valve 29, is attached to the lower hand valve 32 by conduit 34, both the valves 29 and 32 being closed at this time. The hand valve 29 is a part of the container assembly and seals the refrigerant charge therein, which charge is usually placed in the container at another location.

The vacuum pump 21 is then operated with the hand valve 24 and screw driver valve 25 open, so that a vacuum is drawn from the high side of the refrigerating system, which includes the discharge conduit 17 and condenser 16. At the same time, the motor 3 is energized to operate the compressor 2. The operation of the compressor serves two useful functions; first, the oil scoop 8 agitates the lubricant 5, and non-condensable gases occluded in the lubricant are freed; secondly, the compressor evacuates the low side of the refrigerating system including the evaporator 12, suction conduit 13 and the interior of the sealed casing 4. The capillary tube 19 is evacuated by both the compressor 2 and the vacuum pump 21. It is obvious, therefore, that the evacuation process is rapid because the compressor 2 evacuates the low side of the system quickly, and forces the air and non-condensable gases into the high side of the system, where they are readily exhausted by the vacuum pump 21. If the compressor were not operated the vacuum pump would take a relatively long time to evacuate the low side of the system because of the restriction of the capillary tube 19 and the compressor valves (not shown).

The vacuum pump and compressor are operated for about ten minutes, whereupon the hand valve 24 and screw driver valve 25 are closed and the conduit 26 disconnected from the screw driver valve 25, which remains as a part of the refrigerating system and provides a purge valve therefor. The two valves 29 and 32 on the container 28 are then opened and the refrigerant charge is drawn in by the vacuum existing in the refrigerating system. The compressor is then operated until the evaporator 12 frosts over and no more liquid remains in the container 28. This operation usually takes less than one minute. The hand valves 29 and 32 are then closed and the filler tube 35 is pinched off and sealed. The hand valve 32 and conduit 34 are disconnected from the container 28 and hand valve 29, and the latter are returned for a new charge of refrigerant. Several units are preferably operated simultaneously to effect evacuation and charging and, as stated heretofore, are all connected to the vacuum header 22.

From the foregoing, it will be apparent that I have provided apparatus and a method of quickly evacuating and accurately charging refrigerating systems and in which the charging and evacuating apparatus is simple and inexpensive and for which a small space is required for fairly large production because of the rapidity of the process and the small amount of apparatus involved. The container 28 need only be large enough to contain the correct charge of refrigerant, which is usually considerably less than one pound.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. The method of removing non-condensable gases from a refrigerating system including a compressor, and charging the system with refrigerant, which comprises operating the compressor to effect evacuation of the low-pressure side of the system, evacuating non-condensable gases from the high pressure side of the system by connecting the same to a region under vacuum and charging an accurately measured quantity of refrigerant into the system thus evacuated.

2. The method of removing non-condensable gases from a refrigerating system including a compressor, and charging the system with refrigerant and lubricant, which process includes evacuating non-condensable gases from the system by external evacuating means, charging lubricant into the system, agitating the lubricant during said evacuation and charging an accurately measured quantity of refrigerant into the system after the evacuation thereof.

3. The method of removing non-condensable gases from a refrigerating system including a compressor, and charging the system with refrigerant, which comprises attaching a vacuum device to the high-pressure side of the system to remove non-condensable gases therefrom, operating the compressor to evacuate non-condensable gases from the low-pressure side of the system and forcing them into the high-pressure side of the system where they are removed by the vacuum device, and charging an accurately measured quantity of refrigerant into the low-pressure side of the system thus evacuated.

4. The method of removing non-condensable gases from a refrigerating system including a compressor, and charging the system with refrigerant, which comprises attaching a vacuum device to the high-pressure side of the system to remove non-condensable gases therefrom, operating the compressor to evacuate non-condensable gases from the low-pressure side of the system and forcing them into the high-pressure side of the system where they are removed by the vacuum device, and charging an accurately measured quantity of refrigerant into the system thus evacuated from a container connected into said system and containing said accurately measured quantity of refrigerant.

5. The method of removing non-condensable gases from a refrigerating system including a motor and a compressor contained in a hermetically sealed casing, and charging the system with refrigerant and lubricant, which comprises first charging the system with lubricant which collects in a reservoir in the interior of said hermetically sealed casing, operating the compressor to effect agitation of the lubricant and evacuation of the low-pressure side of the system including the interior of said hermetically sealed casing, evacuating non-condensable gases from the high-pressure side of the system by connecting the same to a region under vacuum and charging an accurately measured quantity of refrigerant into the system thus evacuated.

ARTHUR W. WOOD.